(12) United States Patent
Shih et al.

(10) Patent No.: US 9,534,763 B2
(45) Date of Patent: Jan. 3, 2017

(54) LIGHT-ENHANCING COMPONENT AND PHOTOGRAPHIC DEVICE HAVING THE SAME

(71) Applicant: VIVOTEK INC., New Taipei (TW)

(72) Inventors: Li-Shan Shih, New Taipei (TW); Wen-Yuan Li, New Taipei (TW); Chih-Hung Chang, New Taipei (TW); Hsuen-Chun Lu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 22 days.

(21) Appl. No.: 14/587,756

(22) Filed: Dec. 31, 2014

(65) Prior Publication Data
US 2015/0192269 A1    Jul. 9, 2015

(30) Foreign Application Priority Data
Jan. 3, 2014 (TW) .............................. 103100257 A (51) Int. Cl.
| | |
|---|---|
| *F21V 7/00* | (2006.01) |
| *F21V 7/05* | (2006.01) |
| *F21V 7/09* | (2006.01) |
| *G03B 15/03* | (2006.01) |
| *H04N 5/225* | (2006.01) |
| *H04N 5/238* | (2006.01) |
| *H04N 7/18* | (2006.01) |
| *G03B 15/02* | (2006.01) |

(52) U.S. Cl.
CPC ............... *F21V 7/0025* (2013.01); *F21V 7/05* (2013.01); *F21V 7/09* (2013.01); *G03B 15/02* (2013.01); *G03B 15/03* (2013.01); *H04N 5/2256* (2013.01); *H04N 5/238* (2013.01); *H04N 7/18* (2013.01)

(58) Field of Classification Search
CPC ........ H04N 5/2256; H04N 5/238; H04N 7/18; G03B 15/02; G03B 15/03; F21V 7/0025; F21V 7/05; F21V 7/09
USPC .......................................................... 348/370
See application file for complete search history.

(56) References Cited

U.S. PATENT DOCUMENTS

| | | | | |
|---|---|---|---|---|
| 4,547,841 A | * | 10/1985 | Quiogue | F21V 7/09 362/269 |
| 6,956,608 B1 | * | 10/2005 | Shapiro | G06K 9/00046 250/227.28 |
| 9,234,648 B2 | * | 1/2016 | Schneider | F21V 5/004 |

* cited by examiner

*Primary Examiner* — Tuan Ho
(74) *Attorney, Agent, or Firm* — Maschoff Brennan (57) ABSTRACT

The disclosure provides a light-enhancing component and a photographic device having the same. The light-enhancing component includes a light reflective unit and a light source. The light reflective unit includes a first reflecting surface and a second reflecting surface. The light source is disposed between the first reflecting surface and the second reflecting surface. An inclination of the first reflecting surface is different from an inclination of the second reflecting surface.

20 Claims, 6 Drawing Sheets

LIGHT-ENHANCING COMPONENT AND PHOTOGRAPHIC DEVICE HAVING THE SAME

CROSS-REFERENCE TO RELATED APPLICATIONS

This non-provisional application claims priority under 35 U.S.C. §119(a) on Patent Application No(s). 103100257 filed in Taiwan, R.O.C. on Jan. 3, 2014, the entire contents of which are hereby incorporated by reference.

BACKGROUND

Technical Field

The disclosure relates to a light-enhancing component. More particularly, the disclosure relates to a light-enhancing component with asymmetrical reflective surfaces, and a photographic device having the same.

Background

Surveillance cameras are widely used in different kinds of locations, such as industry plants, dormitories, stores, apartments, entrances of buildings or communities, hallways and other remote locations. The surveillance camera is for monitoring and recording human behaviors or accidents so that it is favorable for maintaining social control, recognizing threats, and avoiding criminal activities.

A surveillance camera generally comprises a light-enhancing component for illuminating the places with limited or no lighting. Unfortunately, when the light-enhancing component is manufactured with a poor design, it is unable to illuminate the whole area that is trying to be captured and recorded and the surveillance camera cannot capture images clearly. Moreover, a fish-eye camera has been developed for decreasing the blind spots of surveillance cameras. The viewing range of the fish-eye camera is wide, and the fish-eye camera usually comprises an infrared light source. However, when the fish-eye camera is used in places with limited or no lighting, the fish-eye camera needs to be equipped with a lighting device to light up the whole area evenly, since the emission angle or the light intensity of the infrared light source is limited. For example, a viewing angle of the fish-eye camera is greater than 170 degrees, but a projection angle of the infrared light source is between about 90 degrees and 100 degrees. The projection angle of the infrared light source cannot cover the viewing angle of the fish-eye camera, limiting the image quality of the fish-eye camera. Furthermore, when the fish-eye camera is equipped with many infrared light sources, the center of the images has sufficient illumination, but the peripheral of the images is darker. In other words, the images are captured unevenly, which is called as the "flashlight effect". To sum up, it is important to improve the image quality of surveillance cameras.

SUMMARY

One aspect of the disclosure provides a light-enhancing component which comprises a light reflective unit and a light source. The light reflective unit comprises a first reflecting surface and a second reflecting surface. The light source is disposed between the first reflecting surface and the second reflecting surface. An inclination of the first reflecting surface is different from an inclination of the second reflecting surface.

In another aspect of the disclosure provides a photographic device which comprises the at least one light-enhancing component and an image capturing component. The image capturing component is for capturing an image. The at least one light-enhancing component is disposed at a side of the image capturing component. When the image capturing component captures the image, the at least one light-enhancing component is for emitting light.

BRIEF DESCRIPTION OF THE DRAWINGS

The disclosure will become more fully understood from the detailed description given herein-below and the accompanying drawings which are given by way of illustration only and thus are not limitative of the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
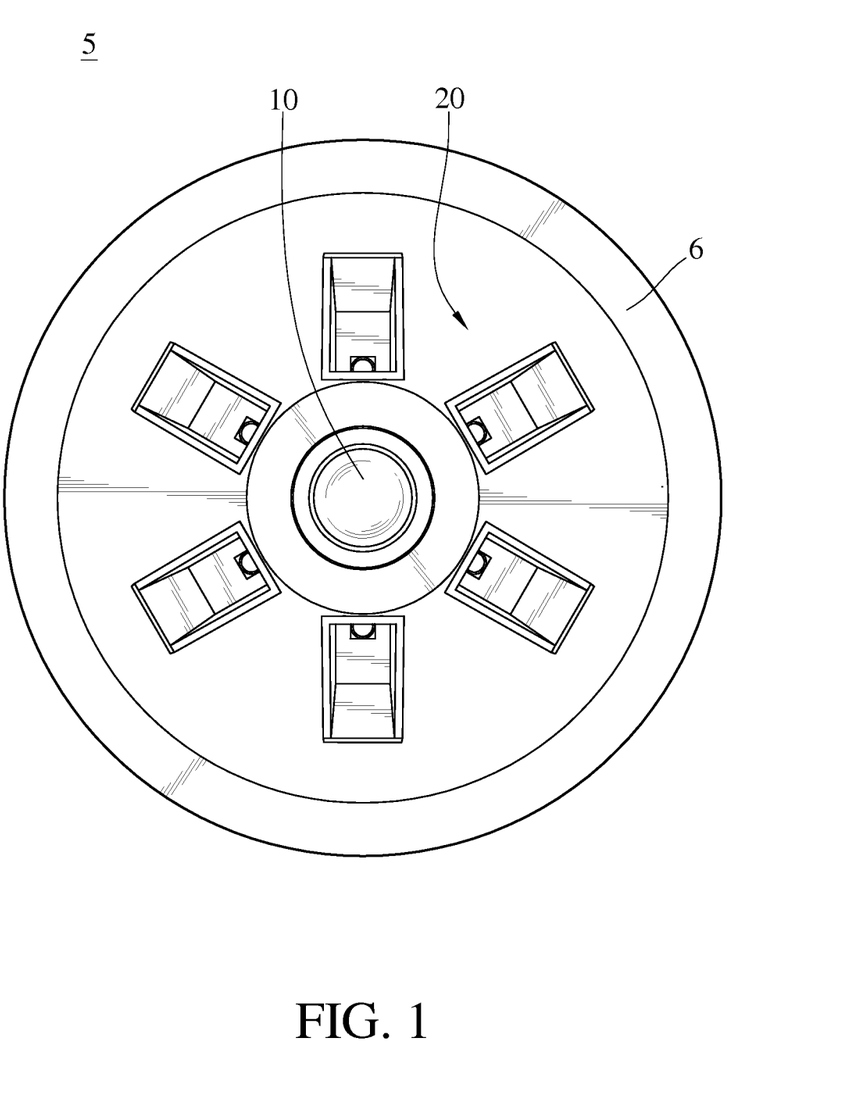
FIG. 1 is a schematic plan view of a photographic device according to a first embodiment of the disclosure.
Figure 2:
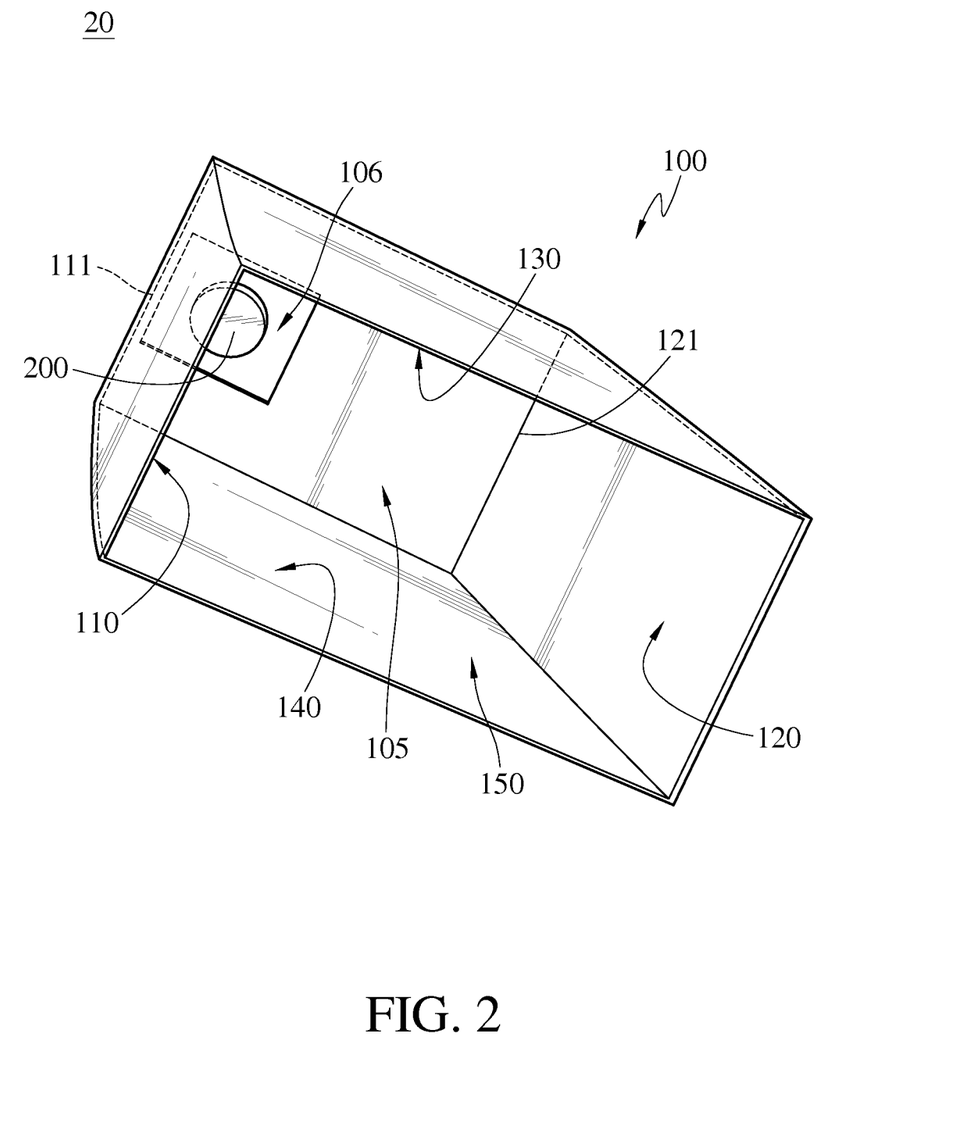
FIG. 2 is a perspective view of a light-enhancing component in FIG. 1.
Figure 3A:
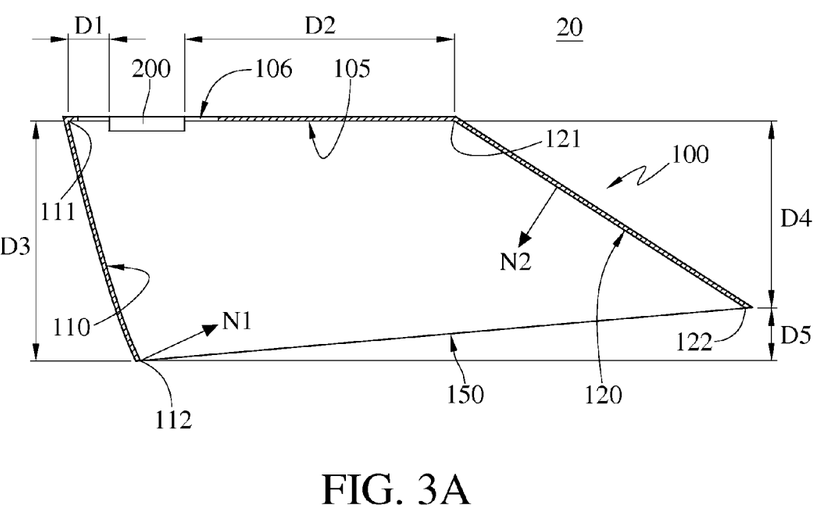
FIG. 3A and FIG. 3B are cross-sectional views of FIG. 2.
Figure 3B:
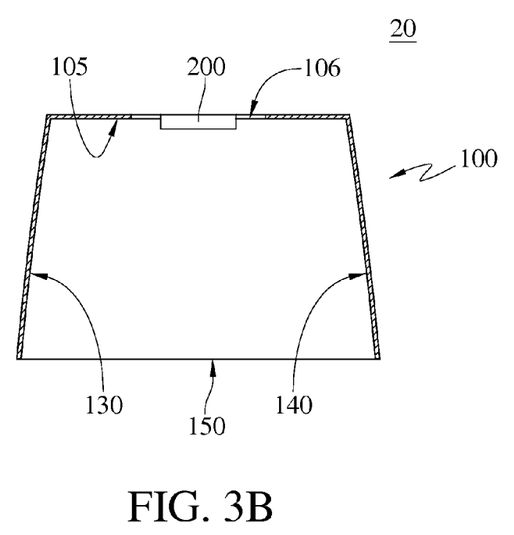

Please refer to FIG. 1 through FIG. 3B. FIG. 1 is a schematic plan view of a photographic device according to a first embodiment of the disclosure. FIG. 2 is a perspective view of a light-enhancing component in FIG. 1. FIG. 3A and FIG. 3B are cross-sectional views of FIG. 2. In this embodiment, the photographic device 5 comprises a shell 6, an image capturing component 10 and at least one light-enhancing component 20.

Electronic components (not shown in figures), such as an image sensor and a circuit board, are disposed in the shell 6. The image capturing component 10, for example, is a fish eye lens. A major portion of the image capturing component 10 is located inside the shell 6, whereas another part of the image capturing component 10 protrudes outward from the shell 6 for capturing an image. In this embodiment, the quantity of the at least one light-enhancing component 20 is six. However, the quantity of the at least one light-enhancing component 20 is not limited to six. For example, the quantity of the at least one light-enhancing component 20 is one in other embodiments, and the light-enhancing component 20 is located at a side of the image capturing component 10.

Moreover, in this embodiment, the light-enhancing component 20 comprises a light reflective unit 100 and a light source 200.

The light reflective unit 100 comprises a reflective bottom surface 105, a first reflecting surface 110, a second reflecting surface 120, a third reflecting surface 130 and a fourth reflecting surface 140. The first reflecting surface 110 is opposite to the second reflecting surface 120, and the third reflecting surface 130 is opposite to the fourth reflecting surface 140. The first reflecting surface 110, the second reflecting surface 120, the third reflecting surface 130 and the fourth reflecting surface 140 are connected to the peripheral of the same side of the reflective bottom surface 105 and both of them extend outward, respectively. Thus, an opening 150 is formed by the first reflecting surface 110, the second reflecting surface 120, the third reflecting surface 130 and the fourth reflecting surface 140 away from the reflective bottom surface 105. Additionally, the first reflecting surface 110 is located between the image capturing component 10 and the light source 200.

In this embodiment, with respect to the reflective bottom surface 105, the first reflecting surface 110 and the second reflecting surface 120 are asymmetric, and the third reflecting surface 130 and the fourth reflecting surface 140 are symmetric. First, the asymmetry between the first reflecting surface 110 and the second reflecting surface 120 will be described as follows.

A height of the first reflecting surface 110 (extended from the reflective bottom surface 105) is greater than a height of the second reflecting surface 120 (extended from the reflective bottom surface 105). In other words, the first reflecting surface 110 has a first end 111 and a second end 112 which are opposite to each other, and the second reflecting surface 120 has a first end 121 and a second end 122 which are opposite to each other. The first end 111 of the first reflecting surface 110 and the first end 121 of the second reflecting surface 120 are connected to two sides of the reflective bottom surface 105 which are opposite to each other. A vertical distance D3 between the reflective bottom surface 105 and the second end 112 of the first reflecting surface 110 (the relative height of the first reflecting surface 110 which is parallel to the normal line of the reflective bottom surface 105) is greater than a vertical distance D4 between the reflective bottom surface 105 and the second end 122 of the second reflecting surface 120 (the relative height of the second reflecting surface 120 which is parallel to the normal line of the reflective bottom surface 105). Moreover, a horizontal distance between the first end 111 and the second end 112 of the first reflecting surface 110 (the relative length which is perpendicular to the normal line of the reflective bottom surface 105) is greater than a horizontal distance D1 between the light source 200 and the first end 111 of the first reflecting surface 110.

In addition to the height of the first reflecting surface 110 and the height of the second reflecting surface 120 being asymmetric, an inclination of the first reflecting surface 110 and an inclination of the second reflecting surface 120 are also asymmetric. In this embodiment, the first reflecting surface 110 and the second reflecting surface 120 are tilted toward the same direction with respect to the reflective bottom surface 105, and the inclination of the first reflecting surface 110 is different from the inclination of the second reflecting surface 120. For example, a direction indicated by a normal vector N2 of the second reflecting surface 120 is far away from the reflective bottom surface 105, certain light emitted from the light source 200 is reflected by the second reflecting surface 120 towards the region under the reflective bottom surface 105 accordingly. Additionally, a direction indicated by a normal vector N1 of the first reflecting surface 110 is toward the reflective bottom surface 105. The inclination of the second reflecting surface 120 relative to the reflective bottom surface 105 is greater than the inclination of the first reflecting surface 110 relative to the reflective bottom surface 105. Accordingly, the lights emitted from the light source 200 are classified into three types. The first type is the light reflected by the first reflecting surface 110, the reflective bottom surface 105 and the second reflecting surface 120 sequentially, and finally located under the reflective bottom surface 105. The second type is the light reflected by the first reflecting surface 110 and the second reflecting surface 120 sequentially, and finally located under the reflective bottom surface 105. The third type is the light reflected outward between an interval (formed by a height difference D5 between the first reflecting surface 110 and the second reflecting surface 120) by the first reflecting surface 110 (towards the right side of second reflecting surface 120 in FIG. 3A).

In this embodiment, the first reflecting surface 110 is a curved surface, the second reflecting surface 120 is a plane, and the first reflecting surface 110 and the second reflecting surface 120 are asymmetric with respect to the reflective bottom surface 105. However, in other embodiments, both the first reflecting surface 110 and the second reflecting surface 120 are curved surfaces, a curvature of the first reflecting surface 110 is different from a curvature of the second reflecting surface 120, and the first reflecting surface 110 and the second reflecting surface 120 are asymmetric with respect to the reflective bottom surface 105.

The symmetry between the third reflecting surface 130 and the fourth reflecting surface 140 will be described as follows. A height of the third reflecting surface 130 and a height of the fourth reflecting surface 140 are symmetric. The height of the third reflecting surface 130 and the height of the fourth reflecting surface 140 are gradually decreased from the second end 112 of the first reflecting surface 110 to the second end 122 of the second reflecting surface 120 (namely, the height of the third reflecting surface 130 and the height of the fourth reflecting surface 140 are gradually decreased from D3 to D4).

An inclination of the third reflecting surface 130 and an inclination of the fourth reflecting surface 140 are symmetric, and a curvature of the third reflecting surface 130 and a curvature of the fourth reflecting surface 140 are also symmetric. Moreover, with respect to the reflective bottom surface 105, the inclination of the third reflecting surface 130 and the inclination of the fourth reflecting surface 140 are the same, and the curvature of the third reflecting surface 130 and the curvature of the fourth reflecting surface 140 are also the same.

The reflective bottom surface 105 further has a notch 106. The light source 200 passes through the notch 106 and is enclosed by the first reflecting surface 110, the second reflecting surface 120, the third reflecting surface 130 and the fourth reflecting surface 140. An interval D1 between the light source 200 and the first reflecting surface 110 is less than an interval D2 between the light source 200 and the second reflecting surface 120. An interval between the light source 200 and the third reflecting surface 130 is equal to an interval between the light source 200 and the fourth reflecting surface 140. The light emitted from the light source 200 is reflected outward from the opening 150 by the first reflecting surface 110, the second reflecting surface 120, the third reflecting surface 130 and the fourth reflecting surface 140, thereby enhancing the illumination of the image capturing component 10.

In this embodiment, the light-enhancing components 20 are arranged around the image capturing component 10 with constant angles, namely, evenly distributed around the image capturing component 10. For example, when the quantity of the light-enhancing components 20 is six, and a compensating angle (or fill-in angle) of a single light-enhancing component 20 is slightly larger than 60 degrees (on x-y plane) in this embodiment. Accordingly, the constant angles are 60 degrees, and all compensating angles are interconnected with each other to form a 360-degree compensating angle. However, in other embodiments, when the compensating angle of a single light-enhancing component 20 is greater than 60 degrees, the light-enhancing components 20 are not being arranged around the image capturing component 10 with constant angles. In other words, a user can adjust the quantity and the arrangement of the light-enhancing component 20 randomly, to form the 360-degree compensating angle.

Figure 4:
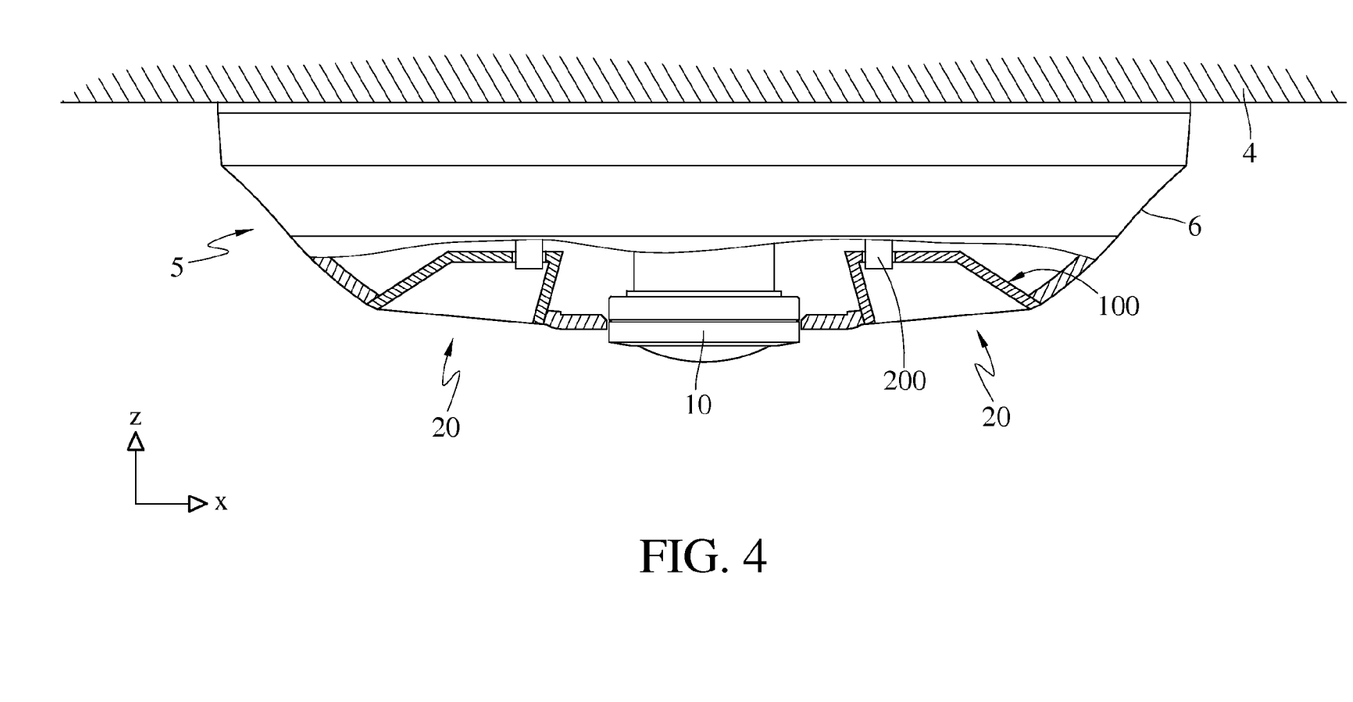
FIG. 4 is a side view of the photographic device in FIG. 1 when the photographic device is disposed on a ceiling.
Figure 5A:
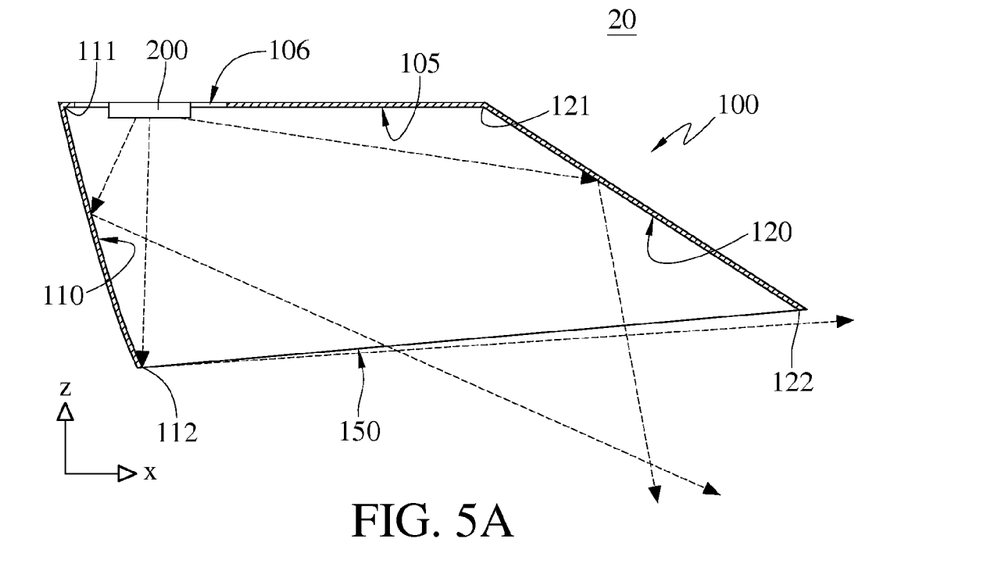
FIG. 5A is a schematic view of a first reflecting surface and a second reflecting surface of a light reflective unit in FIG. 2 where light emitted from a light source is reflected.
Figure 5B:
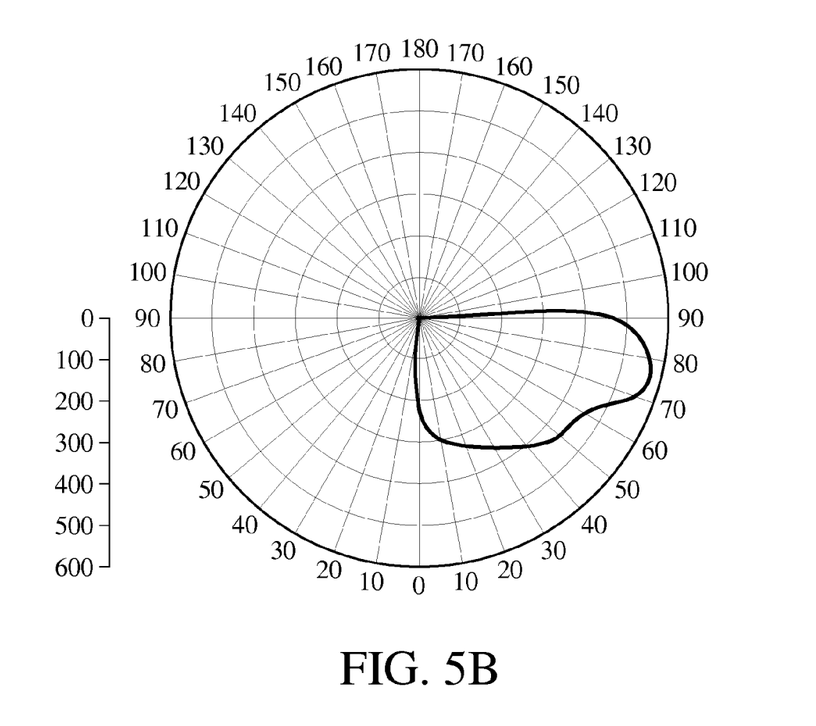
FIG. 5B is an intensity distribution diagram of the lights reflected by the first reflecting surface and the second reflecting surface according to FIG. 5A.
Figure 6A:
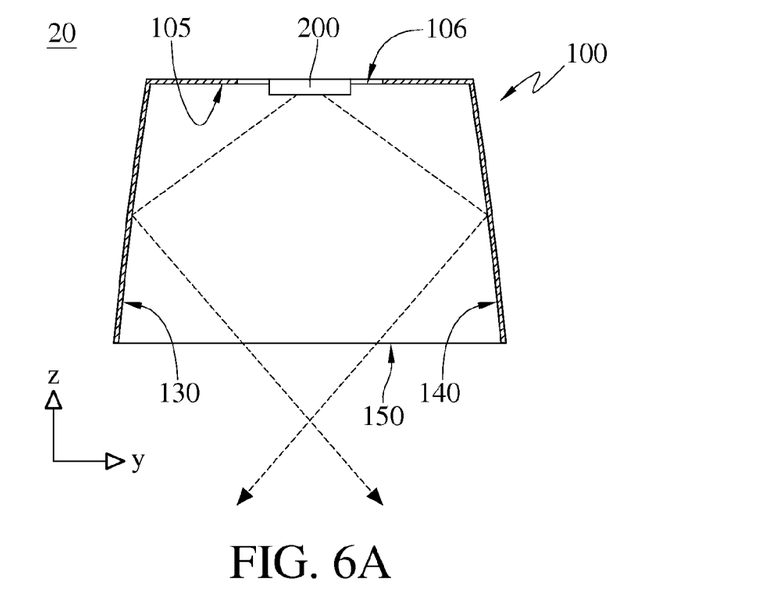
FIG. 6A is a schematic view of a third reflecting surface and a fourth reflecting surface of the light reflective unit in FIG. 2 where lights emitted from the light source is reflected.
Figure 6B:
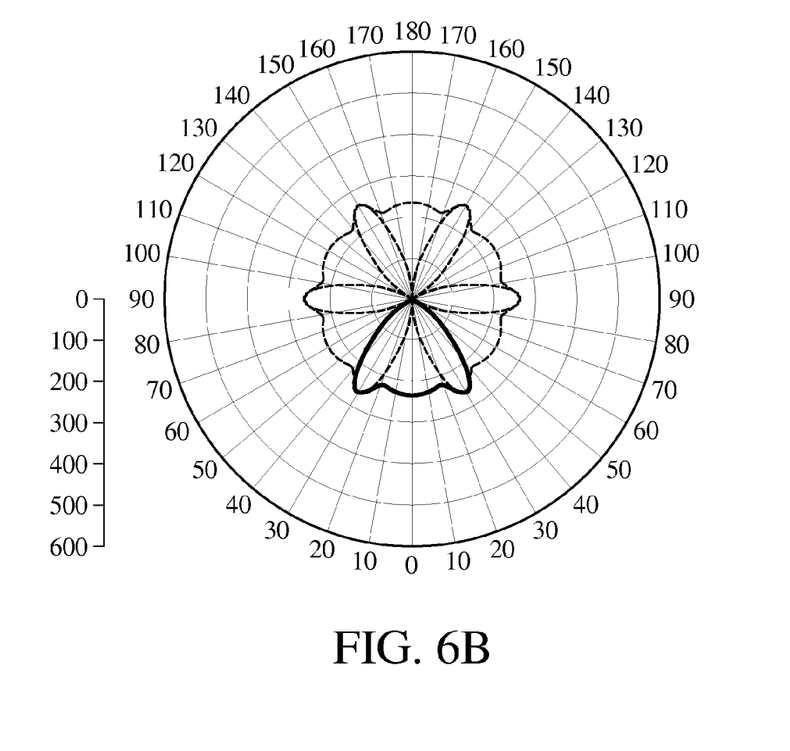
FIG. 6B is an intensity distribution diagram of the lights reflected by the third reflecting surface and the fourth reflecting surface according to FIG. 6A.

Please refer to FIG. 4 through FIG. 6B. FIG. 4 is a side view of the photographic device in FIG. 1 when the photographic device is disposed on a ceiling. FIG. 5A is a schematic view of a first reflecting surface and a second reflecting surface of a light reflective unit in FIG. 2 where light emitted from a light source is reflected. FIG. 5B is an intensity distribution diagram of the lights reflected by the first reflecting surface and the second reflecting surface according to FIG. 5A. FIG. 6A is a schematic view of a third reflecting surface and a fourth reflecting surface of the light reflective unit in FIG. 2 where lights emitted from the light source is reflected. FIG. 6B is an intensity distribution diagram of the lights reflected by the third reflecting surface and the fourth reflecting surface according to FIG. 6A.

As shown in FIG. 4, the photographic device 5 is disposed on the ceiling 4. Since the image capturing component 10 is the fish eye lens, the image capturing component 10 can capture the images of the ceiling 4 or under the ceiling 4. In the following description, for purposes of clarity and conciseness of the description, a three dimensional coordinate is established and the image capturing component 10 is taken as an origin point of the three dimensional coordinate. A plane parallel to the ceiling 4 is an x-y plane. Planes perpendicular to the ceiling 4 are an x-z plane and a y-z plane, respectively.

First, the light-enhancing effect of the light-enhancing component 20 at the x-z plane and the y-z plane is described. As shown in FIG. 4 and FIG. 5A, due to the asymmetry between the first reflecting surface 110 and the second reflecting surface 120, parts of the lights are reflected by the first reflecting surface 110 toward the ceiling 4 which is away from the image capturing component 10 (the third type of the lights as above-mentioned) for illuminating the ceiling 4, and the other light is reflected by the second reflecting surface 120 toward the region which is under the ceiling 4 (the first type and the second type of the lights as above-mentioned), for illuminating the region under the ceiling 4. Accordingly, an intensity distribution diagram of the light-enhancing component 20 is formed asymmetrically at the x-z plane and the y-z plane (as shown in FIG. 5B). Therefore, the image capturing component 10 can capture the images clearly, and the image quality of the photographic device 5 is improved.

The light-enhancing effect of the light-enhancing component 20 on the x-y plane is described. As shown in 6A, due to the symmetry between the third reflecting surface 130 and the fourth reflecting surface 140, an intensity distribution diagram of the light-enhancing component 20 is formed symmetrically at the x-y plane (as shown in FIG. 6B). Referring to FIG. 6B, the compensating angle of a single light-enhancing component 20 is slightly larger than 60 degrees (as a solid line shown in FIG. 6B). In other words, a single light-enhancing component 20 can illuminate the region near the image capturing component 10 in a range of 0 to 60 degrees. In this embodiment, all compensating angles of the light-enhancing components 20 are interconnected with each other to form the 360-degree compensating angle (the lights can be omni-directional) as the solid line and dotted lines shown in FIG. 6B, thereby illuminating (lighting up) the region (at the x-y plane) around the image capturing component 10.

According to the light-enhancing component and the photographic device having the same as the disclosure, due to the asymmetry between the first reflecting surface and the second reflecting surface, the lights emitted from the light source can be uniformly reflected within a photographic range (the x-z plane and the y-z plane) of the image capturing component. Accordingly, the image quality of the surveillance camera can be improved when the surveillance camera is used in an environment without sufficient lighting.

Furthermore, due to the symmetry between the third reflecting surface and the fourth reflecting surface, the 360-degree compensating angle is formed (the lights can be omni-directional), thereby illuminating (lighting up) the region (at the x-y plane) around the image capturing component.

The disclosure will become more fully understood from the said embodiments for illustration only and thus does not limit the disclosure. Any modifications within the spirit and category of the disclosure fall in the scope of the disclosure.

What is claimed is:

1. A light-enhancing component, comprising:
   a light reflective unit comprising a first reflecting surface, a second reflecting surface, and a reflective bottom surface with two sides, the two sides of the reflective bottom surface being opposite to each other and connected to the first reflecting surface and the second reflecting surface, respectively, wherein a height of the first reflecting surface extended from the reflective bottom surface is greater than a height of the second reflecting surface extended from the reflective bottom surface; and
   a light source disposed between the first reflecting surface and the second reflecting surface, and an inclination of the first reflecting surface being different from an inclination of the second reflecting surface.

2. The light-enhancing component according to claim 1, wherein the first reflecting surface is a curved surface and the second reflecting surface is a plane.

3. The light-enhancing component according to claim 1, wherein both the first reflecting surface and the second reflecting surface are curved surfaces, and a curvature of the first reflecting surface is different from a curvature of the second reflecting surface.

4. The light-enhancing component according to claim 1, wherein the first reflecting surface has a first end and a second end which are opposite to each other, and a horizontal distance between the first end and the second end is greater than a horizontal distance between the light source and the first end.

5. The light-enhancing component according to claim 1, wherein the second reflecting surface has a first end and a second end which are opposite to each other, the first end of the first reflecting surface and the first end of the second reflecting surface are connected to the two sides of the reflective bottom surface respectively, and a vertical distance between the reflective bottom surface and the second end of the first reflecting surface is greater than a vertical distance between the reflective bottom surface and the second end of the second reflecting surface.

6. The light-enhancing component according to claim 1, wherein the light reflective unit further comprises a third reflecting surface and a fourth reflecting surface, the light source is located between the third reflecting surface and the fourth reflecting surface, and an interval between the light source and the third reflecting surface is equal to an interval between the light source and the fourth reflecting surface.

7. The light-enhancing component according to claim 6, wherein both the third reflecting surface and the fourth reflecting surface are curved surfaces, and a curvature of the third reflecting surface is equal to a curvature of the fourth reflecting surface.

8. The light-enhancing component according to claim 6, wherein the light source is enclosed by the first reflecting surface, the second reflecting surface, the third reflecting surface and the fourth reflecting surface, an opening is formed by the first reflecting surface, the second reflecting surface, the third reflecting surface and the fourth reflecting surface away from the reflective bottom surface, and lights emitted from the light source are reflected outward from the opening by the first reflecting surface, the second reflecting surface, the third reflecting surface and the fourth reflecting surface.

9. A photographic device, comprising:
at least one light-enhancing component comprising:
a light reflective unit comprising a first reflecting surface, a second reflecting surface, and a reflective bottom surface with two sides, the two sides of the reflective bottom surface being opposite to each other and connected to the first reflecting surface and the second reflecting surface, respectively, wherein a height of the first reflecting surface extended from the reflective bottom surface is greater than a height of the second reflecting surface extended from the reflective bottom surface; and
a light source disposed between the first reflecting surface and the second reflecting surface, and an inclination of the first reflecting surface being different from an inclination of the second reflecting surface; and
an image capturing component for capturing an image;
wherein, the at least one light-enhancing component is disposed at a side of the image capturing component and is for emitting light when the image capturing component captures the image.

10. The photographic device according to claim 9, wherein the quantity of the at least one light-enhancing component is more than one, the light-enhancing components are arranged around the image capturing component with constant angles, and the image capturing component is located inside and enclosed by the light-enhancing components.

11. The photographic device according to claim 9, wherein the first reflecting surface is a curved surface and the second reflecting surface is a plane.

12. The photographic device according to claim 9, wherein both the first reflecting surface and the second reflecting surface are curved surfaces, and a curvature of the first reflecting surface is different from a curvature of the second reflecting surface.

13. The photographic device according to claim 9, wherein the first reflecting surface has a first end and a second end which are opposite to each other, and a horizontal distance between the first end and the second end is greater than a horizontal distance between the light source and the first end.

14. The photographic device according to claim 9, wherein the second reflecting surface has a first end and a second end which are opposite to each other, the first end of the first reflecting surface and the first end of the second reflecting surface are connected to the two sides of the reflective bottom surface respectively, and a vertical distance between the reflective bottom surface and the second end of the first reflecting surface is greater than a vertical distance between the reflective bottom surface and the second end of the second reflecting surface.

15. The photographic device according to claim 9, wherein the light reflective unit further comprises a third reflecting surface and a fourth reflecting surface, the light source is located between the third reflecting surface and the fourth reflecting surface, and an interval between the light source and the third reflecting surface is equal to an interval between the light source and the fourth reflecting surface.

16. The photographic device according to claim 15, wherein both the third reflecting surface and the fourth reflecting surface are curved surfaces, and a curvature of the third reflecting surface is equal to a curvature of the fourth reflecting surface.

17. The photographic device according to claim 15, wherein the light source is enclosed by the first reflecting surface, the second reflecting surface, the third reflecting surface and the fourth reflecting surface, an opening is formed by the first reflecting surface, the second reflecting surface, the third reflecting surface and the fourth reflecting surface away from the reflective bottom surface, and lights emitted from the light source are reflected outward from the opening by the first reflecting surface, the second reflecting surface, the third reflecting surface and the fourth reflecting surface.

18. A photographic device, comprising:
a plurality of light-enhancing components, and each of the plurality of light-enhancing components comprising:
a light reflective unit comprising a first reflecting surface and a second reflecting surface; and
a light source disposed between the first reflecting surface and the second reflecting surface, and an inclination of the first reflecting surface being different from an inclination of the second reflecting surface; and
an image capturing component for capturing an image;
wherein, the plurality of light-enhancing components are arranged around the image capturing component with constant angles, the image capturing component is located inside and enclosed by the plurality of light-enhancing components, and the plurality of light-enhancing components are for emitting light when the image capturing component captures the image.

19. The photographic device according to claim 18, wherein the light reflective unit further comprises a reflective bottom surface with two sides, the two sides of the reflective bottom surface are opposite to each other and connected to the first reflecting surface and the second reflecting surface respectively, and a height of the first reflecting surface extended from the reflective bottom surface is greater than a height of the second reflecting surface extended from the reflective bottom surface.

20. The photographic device according to claim 19, wherein the light reflective unit further comprises a third reflecting surface and a fourth reflecting surface, the light source is located between the third reflecting surface and the fourth reflecting surface, and an interval between the light source and the third reflecting surface is equal to an interval between the light source and the fourth reflecting surface.

\* \* \* \* \*